(12) United States Patent
    Adam

(10) Patent No.: US 9,943,093 B2
(45) Date of Patent: Apr. 17, 2018

(54) APPARATUS FOR PASTEURIZING AND COOLING FOOD PRODUCTS

(71) Applicant: SINTECO IMPIANTI S.R.L., Sesto San Giovanni (MI) (IT)

(72) Inventor: Frank Adam, Sesto San Giovanni (IT)

(73) Assignee: SINTECO IMPIANTI S.R.L., Sesto San Giovanni (MI) (IT)

( * ) Notice: Subject to any disclaimer, the term of this patent is extended or adjusted under 35 U.S.C. 154(b) by 313 days.

(21) Appl. No.: 14/489,443

(22) Filed: Sep. 17, 2014

(65) Prior Publication Data
    US 2016/0073674 A1    Mar. 17, 2016

(51) Int. Cl.
    *A23L 3/00*    (2006.01)
    *A23L 3/18*    (2006.01)
    *A23L 3/04*    (2006.01)

(52) U.S. Cl.
    CPC ............... *A23L 3/185* (2013.01); *A23L 3/003* (2013.01); *A23L 3/04* (2013.01)

(58) Field of Classification Search
    CPC ... A23L 3/003; A23L 3/04; A23L 3/16; A23L 3/18; A23L 3/24; A23L 3/36
    USPC ......... 99/467, 468, 470, 474, 476, 477, 478, 99/479, 443 C
    See application file for complete search history.

(56) References Cited

U.S. PATENT DOCUMENTS

| 3,961,569 | A | * | 6/1976 | Kenyon | A23L 3/04 219/700 |
|---|---|---|---|---|---|
| 5,772,958 | A | * | 6/1998 | Nielsen | A23L 3/003 134/131 |
| 6,142,065 | A | * | 11/2000 | Panella | A23L 3/003 99/330 |
| 6,629,493 | B1 | * | 10/2003 | Schaible, II | A21D 13/007 99/352 |
| 7,993,603 | B2 | * | 8/2011 | Amedeo | A23L 3/01 422/21 |
| 2015/0010679 | A1 | * | 1/2015 | Strong | A23B 4/0053 426/233 |

* cited by examiner

*Primary Examiner* — Reginald L Alexander
(74) *Attorney, Agent, or Firm* — Hedman & Costigan, P.C.; James V. Costigan; Kathleen A. Costigan

(57) ABSTRACT

An apparatus for pasteurizing and cooling food products comprises a pasteurizing tunnel, a first air processing unit associated with the pasteurizing tunnel, and a transfer unit for transferring the food products from the pasteurizing tunnel to a cooling tunnel comprising a second air processing unit, the pasteurizing tunnel comprising two thermally independent in-line sections consisting of a steam pasteurizing section and a pre-packaging section.

18 Claims, 7 Drawing Sheets

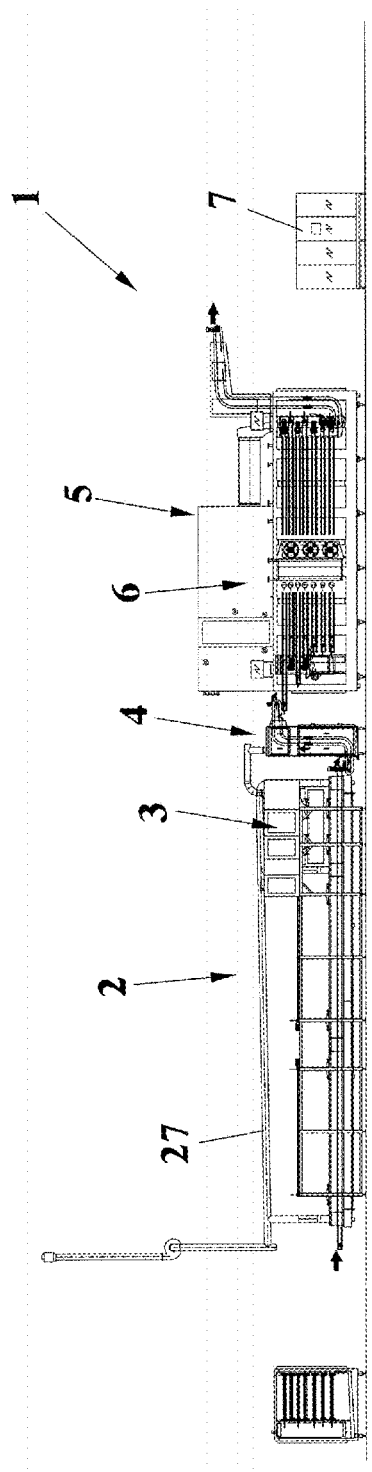
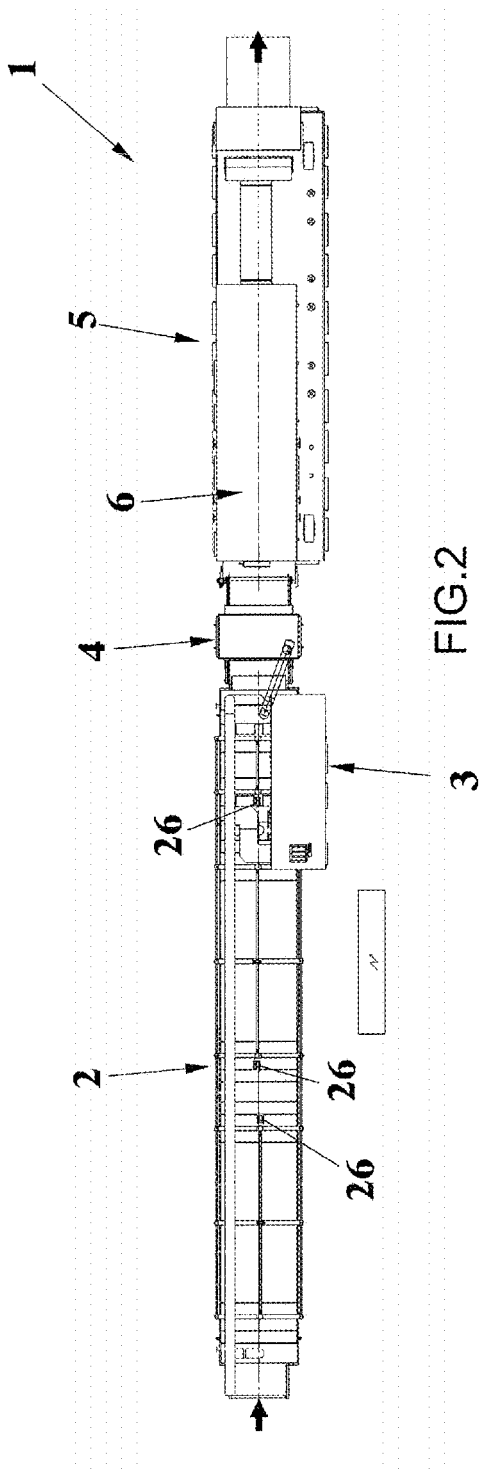

ND COOLING FOOD PRODUCTS

APPARATUS FOR PASTEURIZING AND COOLING FOOD PRODUCTS

BACKGROUND OF THE INVENTION

The present invention relates to an apparatus for pasteurizing and cooling food products.

More specifically, the present invention relates to an apparatus performing a pasteurizing, a packaging and cooling of products such as stuffed pasta ("ravioli", "tortellini" and so on), super-fine pasta ("trofie", "orecchiette", and so on), gnocchi, even of a stuffed type.

As is known, pasteurizing is a thermal processing method performed at a high temperature for destroying microorganisms harmful to food products.

The above process provides an improved assurance of properly preserving the food products, both with respect to their quality and their "shelf life", i.e. their preserving time period.

SUMMARY OF THE INVENTION

The aim of the present invention is to provide an apparatus for pasteurizing, pre-packaging and cooling food products in a more efficient manner than prior like apparatus.

Within the scope of the above aim, a main object of the invention is to provide such an apparatus specifically designed for processing food products such as stuffed pasta ("ravioli", "tortellini", and so on), super-fine pasta ("trofie", "orecchiette", and so on), gnocchi, even of a stuffed type.

Another object of the present invention is to provide such an apparatus including an efficient air processing system for safely preventing air from being contaminated.

A further object of the present invention is to provide such an apparatus whose component parts may be washed in a very easy and efficient manner.

Yet another object of the present invention is to provide such an apparatus including an improved operatively flexible control and safety system, adapted to be preset based on the food product characteristics.

Another object of the present invention is to provide such an apparatus including strong and very simple mechanical parts, with an easy washing and servicing access capability.

According to one aspect of the present invention, the above mentioned aim and objects, as well as yet other objects, which will become more apparent hereinafter, are achieved by an apparatus for pasteurizing and cooling food products, characterized in that said apparatus comprises a pasteurizing tunnel, a first air processing unit associated with said pasteurizing tunnel, and a transfer unit for transferring the food products from said pasteurizing tunnel to a cooling tunnel; said cooling tunnel comprising a second air processing unit; said pasteurizing tunnel comprising two thermally independent in-line sections; said two in-line sections comprising a steam pasteurizing section and a pre-packaging section.

BRIEF DESCRIPTION OF THE DRAWINGS

Further characteristics and advantages of the present invention will become more apparent hereinafter from the following disclosure of a preferred, though not exclusive, embodiment of the invention, which is illustrated, by way of an indicative but not limitative example, in the accompanying drawings, where:

FIG. 1 is a partially broken-away side elevation view of the overall apparatus;

FIG. 2 is a top plan view of said apparatus;

DESCRIPTION OF THE PREFERRED EMBODIMENTS

Figure 3:
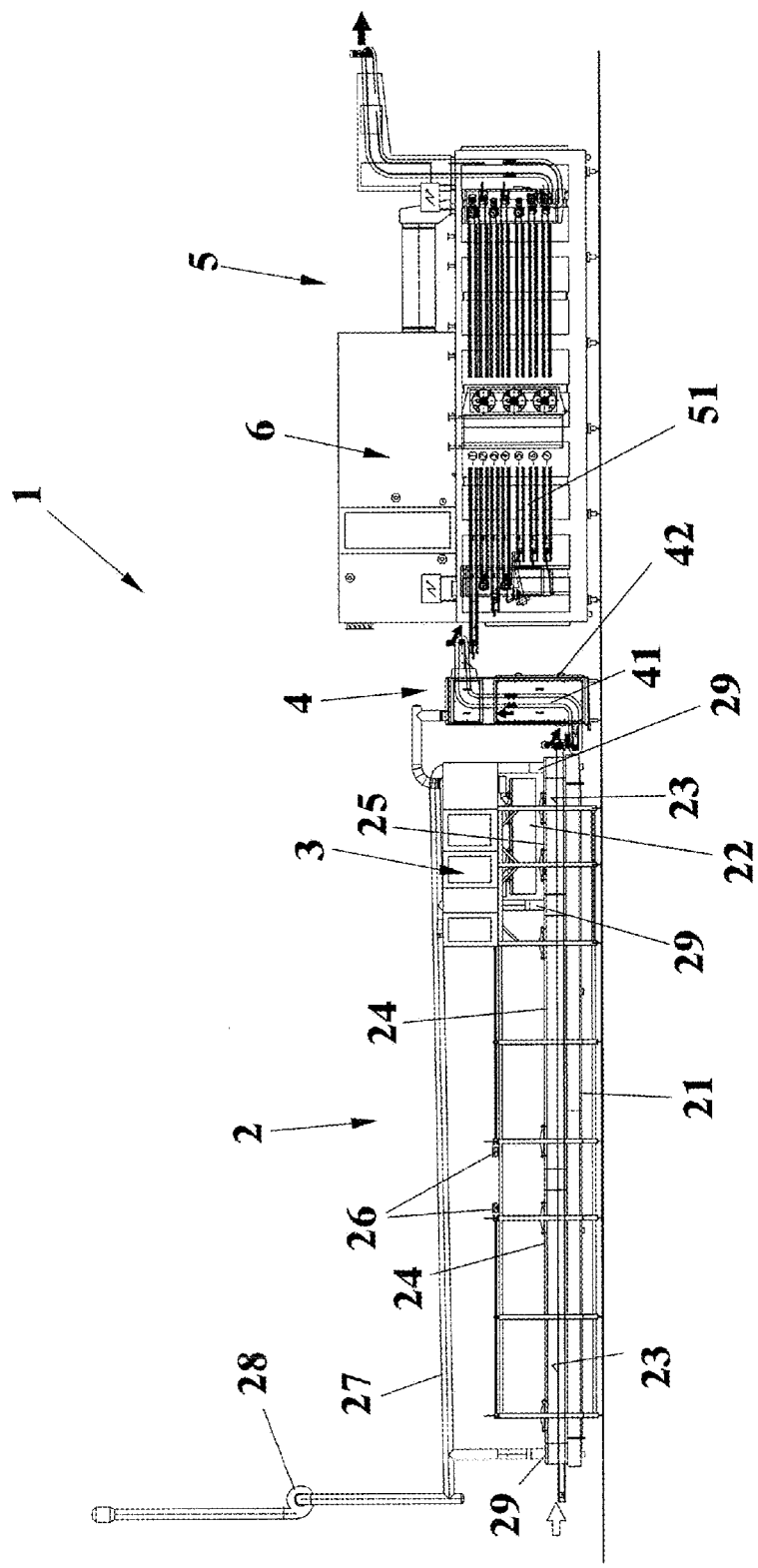
FIG. 3 is a side elevation view, on a larger scale than that of FIG. 1, and in which the pasteurizing tunnel, the transfer unit and the cooling tunnel are shown.
Figure 4:
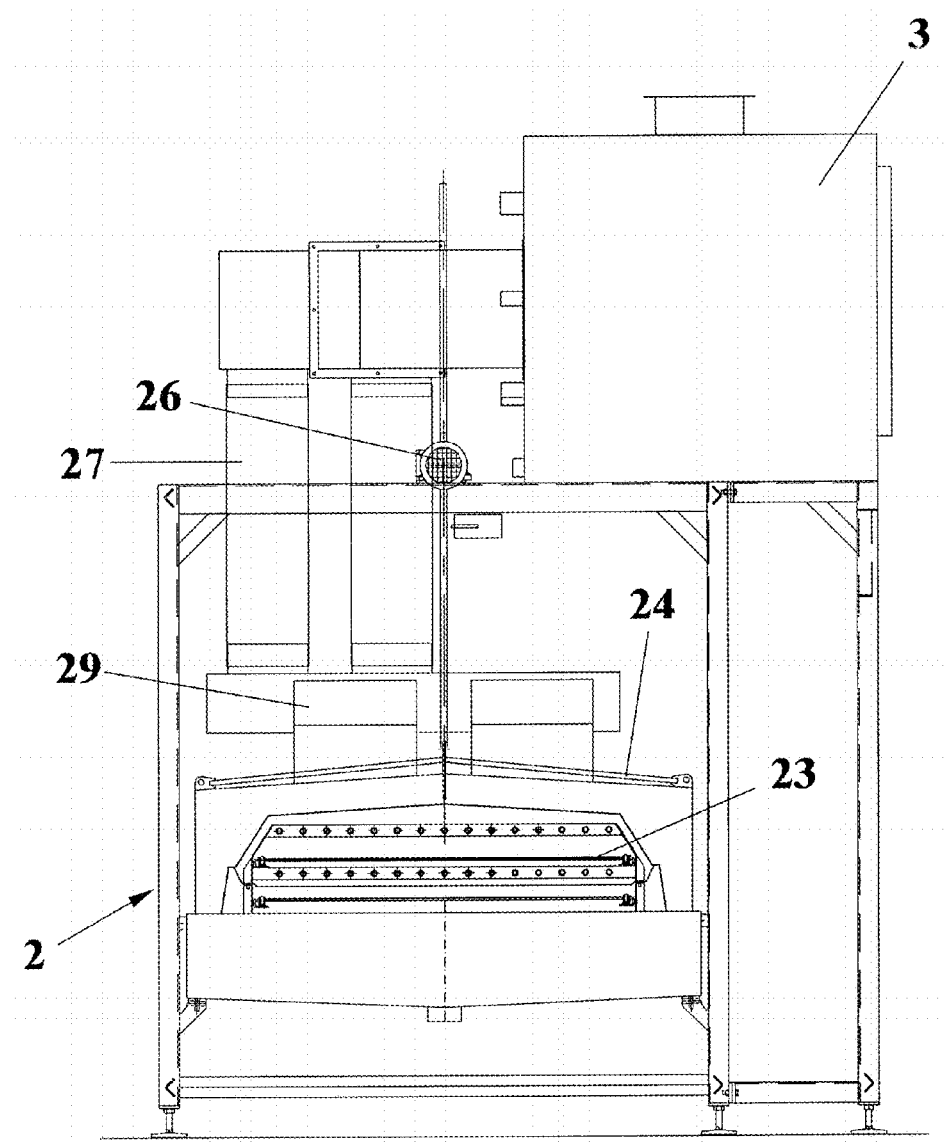
FIG. 4 is a partially cross-sectioned front elevation view of the pasteurizing section.
Figure 5:
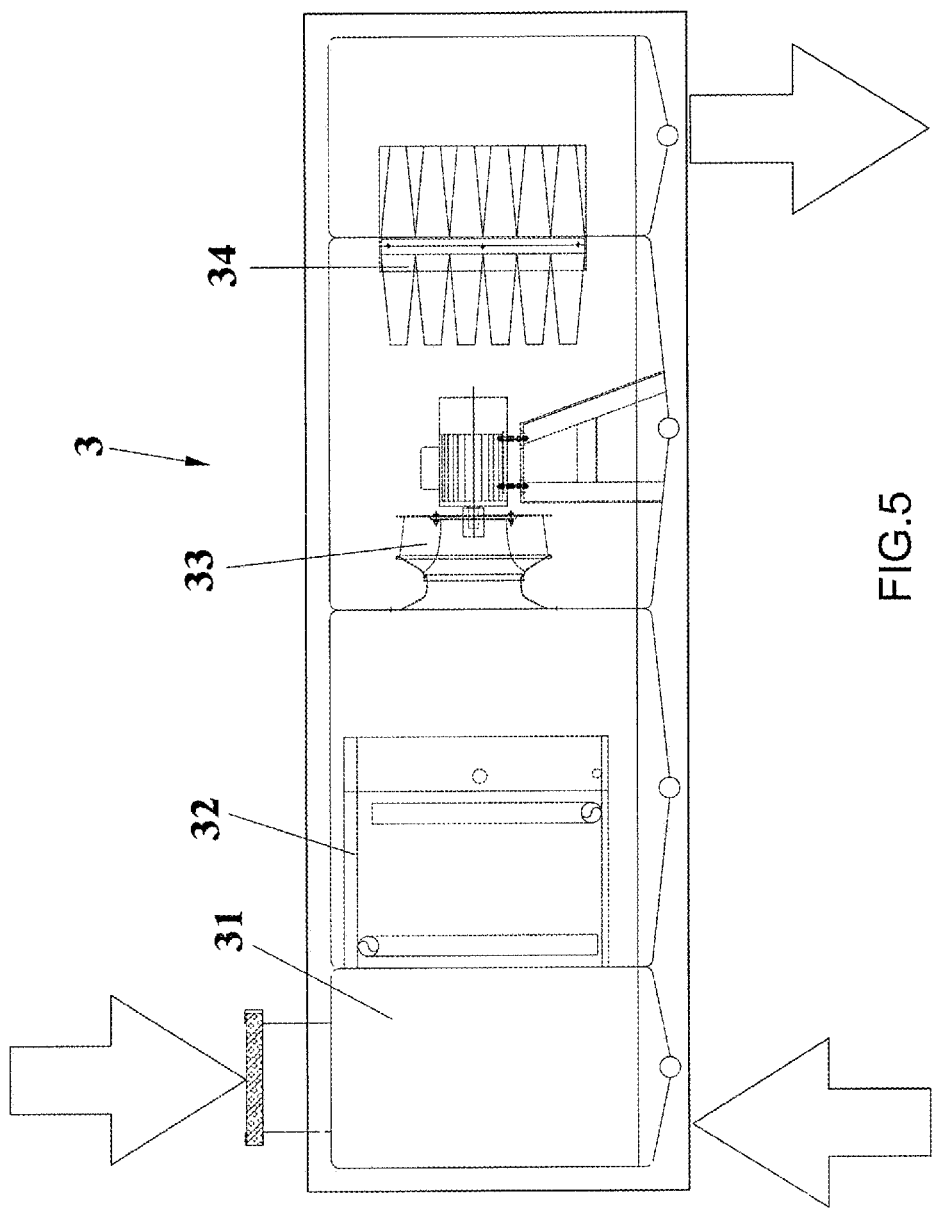
FIG. 5 is a schematic side view of the first air processing unit.
Figure 6:
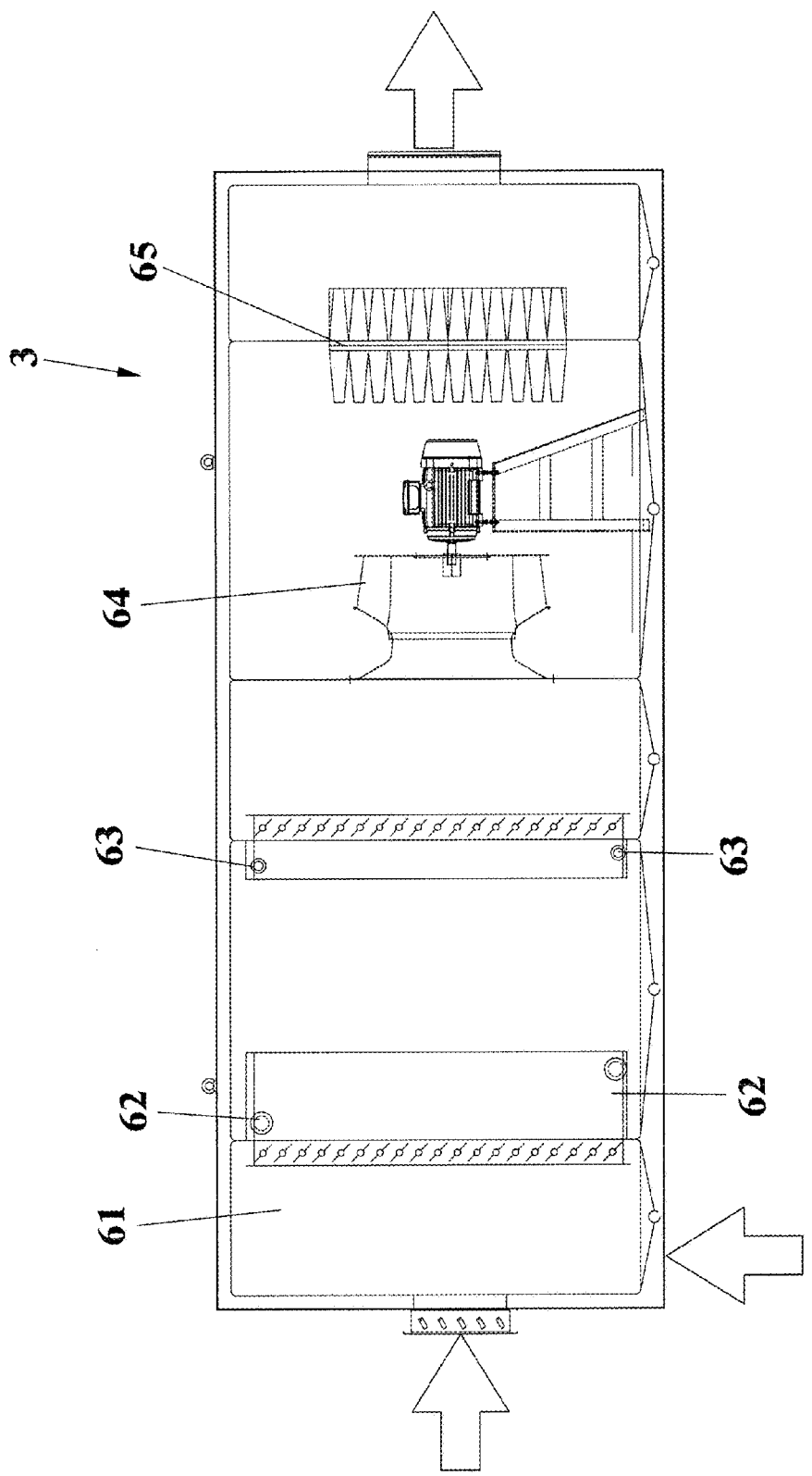
FIG. 6 is a schematic side view of the second air processing unit.
Figure 7:
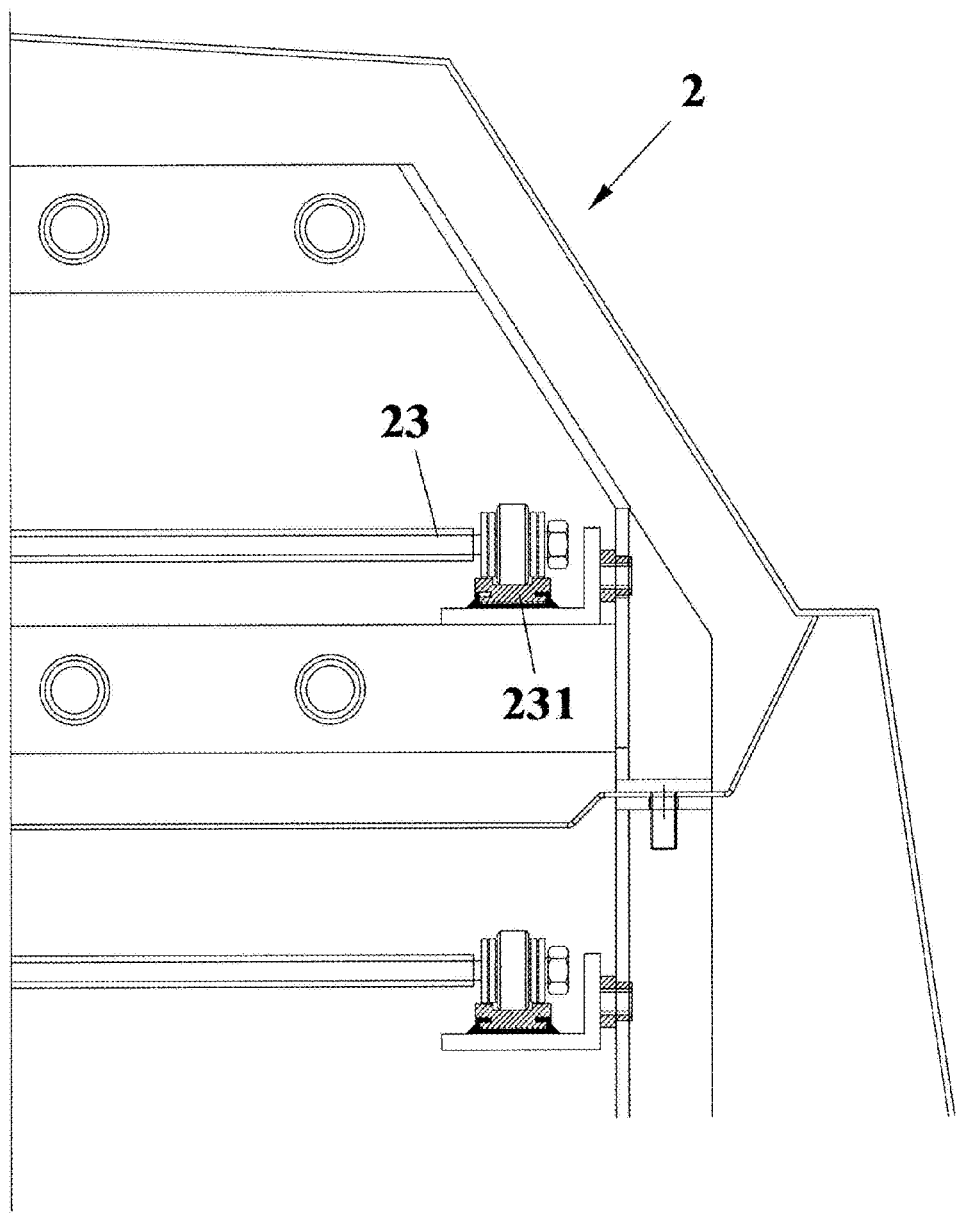
FIG. 7 is a front elevation view of a detail of the pasteurizing section.
Figure 8:
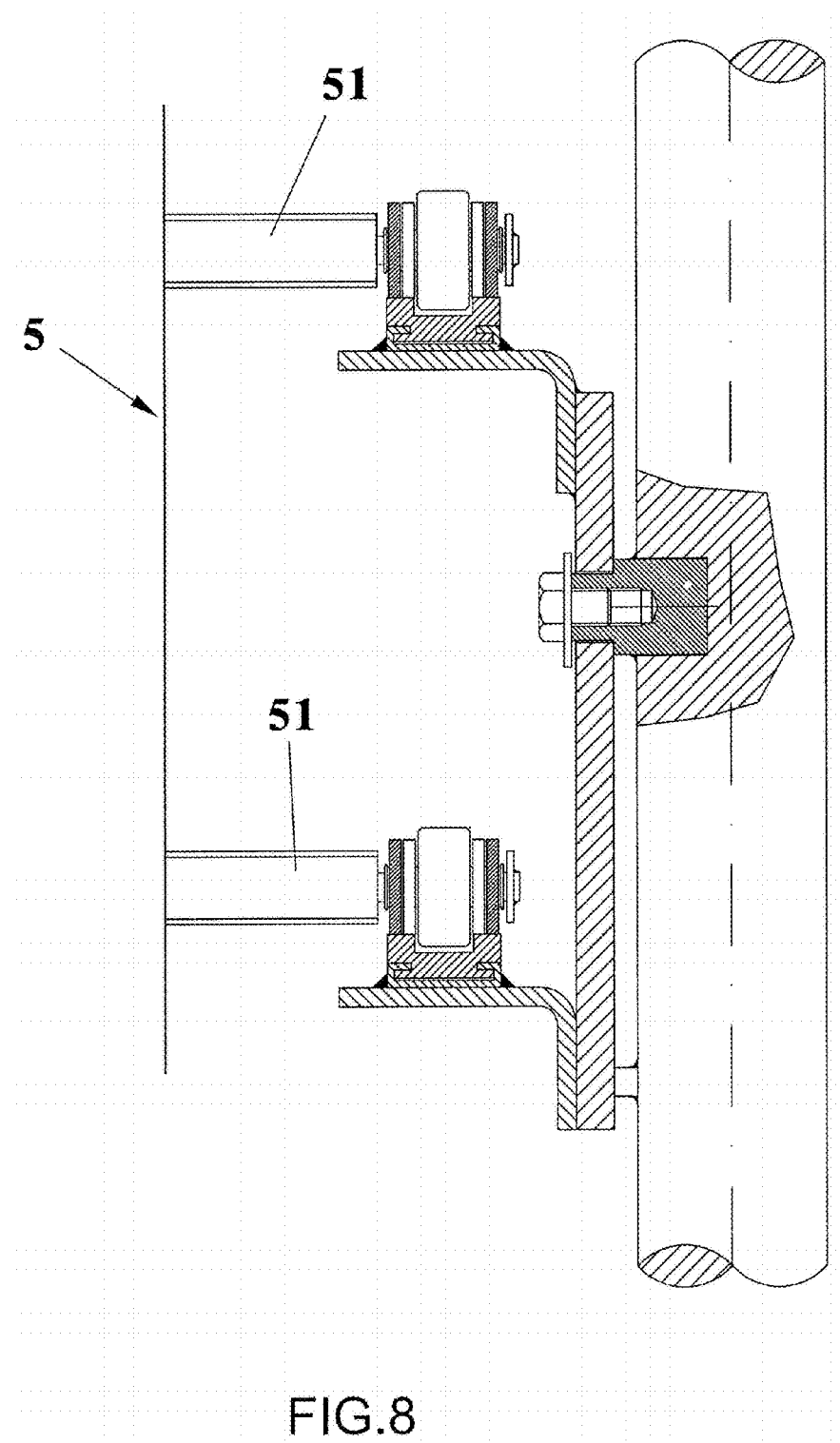
FIG. 8 is a front elevation view of a detail of the cooling tunnel.

With reference to the number references of the above mentioned figures, the apparatus for pasteurizing and cooling food products, according to the present invention, which has been generally indicated by the reference number 1, substantially comprises a pasteurizing tunnel 2, a first air processing unit 3, associated with said pasteurizing tunnel 2, and a food product transfer unit 4 for transferring the food products from said pasteurizing tunnel 2 to a cooling tunnel 5, including a second air processing unit 6.

Said pasteurizing tunnel 2 comprises two thermally independent in-line sections, that is a first stainless steel pasteurizing section 21 and a second pre-packaging section 22 (which is specifically designed based on the customer requirements and also on the food product characteristics, said steam pasteurizing section and pre-packaging section being adapted to be separately and independently fed with food products).

The pasteurizing process is performed by directly using steam, whereas the pre-packaging operation is performed by a hot air stream generated by an indirect industrial-steam material thermal exchange.

The food products are conveyed on a stainless steel belt 23, passing through the pasteurizing section and pre-packaging section.

Depending on the food products being pasteurized, the belt 23 may be a self-supporting belt, or can be supported by respective stainless steel supporting guides 231 coated by a controllable wear material.

A built-in feeding speed adjusting system allows to finely and precisely change the food product speed in the pasteurizing section or unit thereby said food product feeding speed may be adjusted according to preset adjusting parameters such as, for example, minimum and maximum times from 2 to 7 minutes (for food products having special characteristics, said times may also be shorter or longer).

A gear wheel is integral with an idle roller of the belt 23, and an inductive sensor reads-out, by a so-called detecting "star", the roller rotation rate and, with the belt in a driven condition, controls the overall system operation.

If an operating problem occurs, for example a breaking of the belt, then an alarm is generated.

In the pasteurizing unit or section emptying period, provided to compensate for possible dead times of the system downstream the packaging section, a counting of the gear wheel teeth allows to detect said emptying, thereby stopping said section and holding it in a stand by condition.

With the belt 23 of the pasteurizing section 2 in operation, as a temperature set point is achieved, then a signal is sent to loading devices to load said belt with further food products.

Advantageously, the pasteurizing section 2 is tightly insulated by a high density rock wool materials, wherein the outer coating is made of a sheet of an AISI 304L stainless steel, welded by any suitable TIG methods.

The pasteurizing machine supporting framework comprises high strength stainless steel section members of an open type, which may be easily washed, as well as height adjustable foot elements.

The inside of the pasteurizing tunnel or section 2 may be easily accessed (for performing washing operations) by raising three movable hoods, that is two movable hoods 24 for the pasteurizing section 21, and a third smaller movable hood 25 for the pre-packaging section 22.

Each said movable hood comprises a hood lifting system, generally indicated by the reference number 26, including a driving motor and nut screw to provide washing and servicing access to said pasteurizing tunnel.

Each said movable hood comprises moreover an opening and closing limit switch, for controlling the movements of said hoods, and safety locking systems for preventing said hoods from accidentally lowering.

At the end portions of the tunnel 2 and between the pasteurizing 21 and pre-packaging 22 sections, four fixed hoods 29 are arranged, three of which are vapor and fume collecting hoods, said fixed hoods further comprising manual gate assemblies, optionally of motor driven type.

Said fixed hoods 29 are coupled, through a coupling manifold 27, to a vapor output system 28.

A closing limit switch switching off the hood downward movement while enabling steam or vapor to enter said pasteurizing tunnel.

If, in operation, said hood is accidentally lifted, then an open-hood alarm is generated, and a steam shut-off valve is closed.

To improve safety in an open hood condition, for each said movable hood four safety pneumatic pistons are moreover provided, each piston comprising a position sensor for preventing each hood from being accidentally lowered.

Before starting a hood downward movement, all said safety pistons are driven to a closed condition and, as the safety piston limit switches detect a withdrawn condition of all said safety pistons, then a hood movement is enabled.

In turn, an opening limit switch stops the hood lifting movement while allowing the safety pistons to move outward, thereby safely locking the related hood at a safety position.

For controlling the movement of each said hood, on board of an electric control panel 7 a further three-way switch for controlling the lifting-stopping-lowering movements is moreover provided.

Said three-way switch comprises a spring return element for recovering the stop position both for the upward and downward movement.

In order to achieve the movements, an operator should hold the three-way switch at a corresponding switching position.

During the movement of the hoods, a siren arranged above the electric panel provides an intermittent sound, different from that provided for the other alarm conditions, thereby alerting further operators near the pasteurizing section.

Said pasteurizing section—including said hood 24 assembly—, further comprises a plurality of perforated tube assemblies, the so-called "racks", therefrom a sterile steam is ejected.

Each said rack comprises a plurality of manual shut-off valves.

In each said hood, three temperature probes are moreover alternately arranged on the right and left side in the pasteurizing zone; the number of said probes varying depending on the pasteurizing apparatus length.

A processed average temperature value is herein used to adjust a sterile steam modulating valve, providing an overheated sterile steam flow to two tube-assembly heat exchangers, including steam overheating electric resistances.

The overheating steam temperature control is carried out by a further temperature probe arranged on the steam tube at the outlet of the overheating devices, through an adjusting system of a "PWM" (Pulse Width Modulation) type designed for modulating the steam heating electric power.

On the steam tube a flow-rate measuring device is also provided, which, in a case of a flow outage, will switch off, depending on a preset minimum flow rate, said electric resistances thereby preventing the tube assemblies from being overheated.

Same switching off operation being performed as the steam pressure lowers under a threshold value, detected by a temperature probe installed on the steam tube.

In a normal operation, an operator selects, through an operator panel, a target steam flow rate based on the food products being pasteurized, said flow rate being compared with a temperature probe measurement and, in a case of a difference, said steam modulating valve being correspondingly controlled.

The pre-packaging zone 22 includes a smooth tube rack, therethrough an industrial steam flows.

In the hood 25 right and left temperature probe means are alternately arranged and the processed temperature average value is used to adjust a black steam modulating valve.

The tightness of said hoods is achieved by a sealing hydraulic control device, which is continuously supplied with make-up water having a flow rate of few liters/h and being adjusted by a pin faucet.

The first air processing unit 3 processes hot air, in the pre-packaging section 22, said hot air being thermohygrometrically controlled, and being fed from a stainless steel AISI 304L material hot feeding unit also including a cold and hot battery (with stainless steel AISI 304 tubes and aluminium fins), fed by glycol and steam materials, respectively, and controlled by respective control assemblies.

The first air processing unit 3 also comprises a mixing section 31, for mixing recirculating air and outside air, including corresponding manual gate elements, a cooling section 32, supplied with glycol processed water, a post-heating section, supplied with steam, a ventilating section 33 and an absolute filtering section 34.

The first air processing unit 3 comprises the following probes:
- a combined temperature-moisture probe, arranged in a recovery channel;
- a further temperature probe arranged after the cold battery; and
- a combined temperature-moisture probe arranged on the delivery side.

The first air processing unit 3 operates as follows.

In an off condition, the air delivery fan is in a stop condition, the outside air gate is manually opened to a fixed percentage related to the designed flow-rate, and the hot and cold air valves are closed.

In an automatic mode of operation, the unit 3 is enabled to operate as the pasteurizing section 2 operates.

The fan inverter is brought to an operating speed preset by the controlling system holding in a controlled condition the thermohygrometric parameters of the inlet air to the pasteurizing section, thereby partially pre-packaging the food products and partially controlling their moisture contents.

The moisture, recovery temperature and delivery moisture values being displayed on an operating display of the electric panel 7.

The ventilating section doors comprise a limit switch including a corresponding electromagnetic locking device.

As the fan operates, the doors cannot be opened; whereas with the fan in a stop condition, and after a preset time, said doors may be opened.

Outside of said doors, a lockable switch off device is arranged operating as an emergency and servicing device which must not be used for switching off the fan since an accidental operation could cause a breakage of the inverter supplying the fan motor.

The food products are conveyed between the pasteurizing section 2 and the cooling tunnel 5 by a food product transfer unit 4 comprising a lifting belt 41, housed in a mechanical housing 42 of a stainless steel AISI 304L material, preferably of a sterile type, and being closed and sanifiable, with a large size door for inspection and washing purposes.

Said belt is also protected by a sterile atmosphere which has been thermohygrometrically processed to continue the food product packaging operation.

The unit 4 is an overpressurized mini-tunnel, supplied with air from the first air processing unit 3, which air is conveyed through sanifiable ducts.

The cooling tunnel 5 comprises a plurality of overlapping belts 51 onto the end portions of which the food products are caused to fall.

The food product conveying belts are arranged in a cold air ventilated tunnel to properly reduce and control the food product temperature and relative moisture.

The number of said cooling belts depends on the operating capability of the tunnel and ranges from 5 to 9, two of said belts operating to accumulate said food product.

All said belts are driven by a plurality of driving-reducing units controlled by controlling inverters arranged in the electric panel 7.

The food product feeding speed may be changed to allow different types of products to be properly cooled and dried.

Thus, the heat exchange, carried out by a cooling air flow, provides a good and smooth thermal transmission, the temperature being in turn controlled, in a simple and precise manner, without causing thermal shocks to the food product.

The batteries comprise AISI 304 stainless steel tubes and aluminium fins.

Each said battery being controlled by a dedicated controlling assembly, with modulating valves arranged above the tunnel.

Each said controlling assembly is arranged above a stainless steel small basin for collecting condensate water.

The second air processing unit 6 thermohygrometrically processes air for controlling the moisture of the food products being cooled and holding the required overpressure to provide sterile conditions inside the tunnel.

Said second air processing unit 6 comprises a mixing section 61, for mixing recirculating air and outside air, two glycol processed water cooling sections 62, two steam heating sections 63, a ventilating section 64 and an absolute filtering section 65.

Two cooling sections may be herein arranged in parallel to allow the unit 6 to continuously operate during a defrosting operation of one of the two cold batteries.

The second air processing unit 6 comprises a multiple-material construction, strongly bound among the different operating sections and which, owing to a properly designed geometrical relationship and due to the connection of the sections forming it, does not require screws, nails or bolts causing a reduction both of the mechanical strength and the sanifiable and washing properties.

The above specifically designed construction, moreover, prevents any thermal bridges and impurity stagnation regions from occurring.

Thus, the processing unit 6 construction provides a monolithic shell, of an AISI 304L stainless steel material, with inner welds performed by a continuous TIG welding process (and which are successively pickled).

The inner corners are rounded and the surfaces are flat and greatly slanted toward the condensate and washing outlets.

The outer coating of the second air processing unit 6 is made of a stainless steel sheet, with an interposed large thickness thermoacoustic insulation materials, of a rigid foamed polyurethane applied by a spraying method.

This structure improves the strength and stiffness of the air processing unit, while preventing thermal bridges and condensate material from forming outside the unit, and providing moreover a high acoustical insulating coefficient.

The inner components, such as fans, double thermohygrometric batteries and filters, are mounted and firmly suspended and fixed to the unit roof.

The access doors are so designed and made to allow and facilitate any ordinary and extraordinary maintenance operations on the inner components of the air processing unit, and all the inner components may be easily removed through the doors.

Said doors comprising door gaskets of a closed cell type, with related closing and progressive clamping knobs.

A specifically designed control assembly holding the air supplied to the tunnel in a thermohygrometrically controlled condition.

The recovery moisture and temperature and delivery moisture probes allow to clearly display the above parameters.

Two hot and cold battery pairs are arranged in parallel to always hold a constant air flow even during a defrosting of one of the two cold batteries.

Thus, it is possible to constantly maintain a desired inlet air quality and accordingly the healthiness of the product, which may be easily achieved owing to the provision of two gate pairs.

The defrosting operation is performed with hot glycol processed water, based on the same operating principle of the tunnel batteries.

The ventilating section access doors comprise a limit switch with an electromagnetic locking device: as the fan operates, the doors cannot be opened; upon switching off the fan and after a preset time, the doors may be opened.

Outside said doors a lockable sectioning device is arranged which is an emergency and servicing device which must not be used to switch off the fan since an accidental operation could cause a breakage of the inverter supplying the fan motor.

The control electric panel 7 controls the overall apparatus and is arranged in a stainless steel casing near the shop line.

In said panel are moreover provided all the control and protecting devices for all the motors, a PLC with related analogic and digital input/output cards including an ethernet coupling card.

The apparatus comprises moreover a defrosting system for defrosting the batteries, which is achieved by glycol processed hot water or shop water or locally provided by an electric or steam heat exchanger.

All the apparatus is tightly insulated to prevent condensing phenomena on the outer walls from occurring and it is mounted on adjustable foot elements to allow an easy assembling and aid the washing characteristics.

It has been found that the invention fully achieves the intended aim and objects.

In fact, the invention has provided a food product pasteurizing apparatus including a pasteurizing section 2, a transfer unit 4 and a cooling section 5 occupying a small shop space.

The system is very reliable and is controlled by a single main electric control panel 7 to be installed at the most suitable position near the food product processing line.

Advantageously, the apparatus is fully prefabricated and pre-assembled and shop pre-tested before its delivery.

Moreover, the adjusting or controlling assemblies are also pre-mounted, thereby the overall system may be simply and quickly reassembled after its transport and coupled to the mains network.

A further advantage of the subject apparatus is that the pasteurizing section is arranged in a horizontal non-slanted position.

The pasteurizing unit comprises two sections, one including a steam processing and the other a hot air packaging processing, the packaging region further comprising an air processing unit.

The fans of both the air processing units are of a plug fan direct coupling type without pulleys, thereby preventing any air contamination and pulley debris in said air.

The food product transfer between the output of the pasteurizing assembly and the inlet of the cooling assembly is performed through a transfer or conveyor belt arranged in a tunnel which brings the food product from downward to a desired level for it to be loaded in the cooling assembly.

The bottom of each said tunnel has double comparatively high slopes to discharge washing and condensate water.

In practicing the invention, the used materials as well as the related size can be any, depending on requirements.

The invention claimed is:

1. An apparatus for pasteurizing and cooling food products, characterized in that said apparatus comprises a pasteurizing tunnel, a first air processing unit associated with said pasteurizing tunnel, and a transfer unit for transferring the food products from said pasteurizing tunnel to a cooling tunnel; said cooling tunnel comprising a second air processing unit; said pasteurizing tunnel comprising two thermally independent in-line sections; said two in-line sections comprising a steam pasteurizing section and a pre-packaging section; said steam pasteurizing section and said pre-packaging section being adapted to be separately and independently fed with food products, wherein said steam pasteurizing section is subjected to steam processing and said pre-packaging section is subjected to hot air packaging processing that is separate and independent of said steam processing of said steam pasteurizing section.

2. An apparatus, according to claim 1, characterized in that said pasteurizing tunnel comprises a stainless steel belt thereon said food products to be conveyed are arranged; said belt passing through said pasteurizing section and pre-packaging section; a feeding speed adjusting system allowing to change a food product processing time in said pasteurizing tunnel.

3. An apparatus, according to claim 1, characterized in that said pasteurizing tunnel comprises three movable hoods, two hoods for the pasteurizing section and a hood for the pre-packaging section; each said movable hood comprising a lifting system providing access for washing and maintenance operations.

4. An apparatus, according to claim 1, characterized in that said pasteurizing section comprises perforated tube assemblies therefrom a sterile steam is ejected.

5. An apparatus, according to claim 3, characterized in that at each said hood temperature probes are provided, said temperature probes being alternatively arranged on a right and left side of a pasteurizing zone; said temperature probes allowing to calculate a temperature average value for adjusting a sterile steam modulating valve; said sterile steam being overheated by two tube assembly exchangers including electric resistances; an overheating steam temperature being controlled by temperature probe means arranged on the overheated steam outlet tubes, through a PWM adjustment control device modulating a heating electric power; on the steam tube assembly being provided a flow rate measuring device switching off said electric resistances thereby preventing an excessive overheating of the tube assembly and preventing a steam pressure from lowering under a minimum value threshold; a temperature probe being mounted on said tube assembly.

6. An apparatus, according to claim 2, characterized in that said first air processing unit processes air in the pre-packaging section through hot air, said air being thermohygrometrically controlled; said first air processing unit comprising a mixing section for mixing recirculating air and outside air, said mixing section including a plurality of gate elements, a cooling section supplied with glycol processed water, a steam post-heating section, a ventilating section and a filtering section.

7. An apparatus, according to claim 1, characterized in that said transfer unit comprises a lifting belt housed in a closed and sanifiable stainless steel casing, with large inspection and washing doors; said transfer belt being protected by a thermohygrometrically processed sterile atmosphere; said transfer unit operating in an overpressurized condition by air supplied from the first air processing unit.

8. An apparatus, according to claim 1, characterized in that said cooling tunnel comprises a plurality of overlapping belts thereon the food product falls; said overlapping belts being arranged in a cold air ventilated tunnel for reducing and controlling the food product temperature and relative moisture; said overlapping belts comprising at least two belts for accumulating the food product; said food products being fed with a variable feeding speed.

9. An apparatus according to claim 1, characterized in that said food products are fed, in a pasteurized and cooled condition, directly to a packaging machine, in a filtered, cleaned and thermohygrometrically controlled environment, thereby the food products, after packaging, are delivered and stored without requiring further food product processing operations.

10. An apparatus for pasteurizing and cooling food products, characterized in that said apparatus comprises a pasteurizing tunnel, a first air processing unit associated with said pasteurizing tunnel, and a transfer unit for transferring the food products from said pasteurizing tunnel to a cooling tunnel; said cooling tunnel comprising a second air processing unit; said pasteurizing tunnel comprising two thermally independent in-line sections; said two in-line sections comprising a steam pasteurizing section and a pre-packaging section; said steam pasteurizing section and said pre-packaging section being adapted to be separately and independently fed with food products, at end portions of said pasteurizing tunnel and between said pasteurizing and pre-packaging sections there being provided four fixed hoods, three of which for collecting fumes and withdrawing vapors; each said fixed hood being coupled, through a coupling manifold, to a vapor withdrawing system.

11. An apparatus for pasteurizing and cooling food products, characterized in that said apparatus comprises a pasteurizing tunnel, a first air processing unit associated with said pasteurizing tunnel, and a transfer unit for transferring the food products from said pasteurizing tunnel to a cooling tunnel; said cooling tunnel comprising a second air processing unit; said pasteurizing tunnel comprising two thermally independent in-line sections; said two in-line sections comprising a steam pasteurizing section and a pre-packaging section; said steam pasteurizing section and said pre-packaging section being adapted to be separately and independently fed with food products, said second air processing unit being adapted to operate to thermohygrometrically process air for controlling the moisture of the food product being cooled and to hold an overpressure for providing a sterile environment in said tunnel; said second air processing unit comprising a mixing section for mixing recirculating air and outside air, two glycol processed air cooling sections, two steam heating sections, a ventilating section and an absolute filtering section.

12. An apparatus for pasteurizing and cooling food products, characterized in that said apparatus comprises a pasteurizing tunnel, a first air processing unit associated with said pasteurizing tunnel, and a transfer unit for transferring the food products from said pasteurizing tunnel to a cooling tunnel; said cooling tunnel comprising a second air processing unit; said pasteurizing tunnel comprising two thermally independent in-line sections; said two in-line sections comprising a steam pasteurizing section and a pre-packaging section wherein said pasteurizing tunnel comprises three movable hoods, two hoods for the pasteurizing section and a hood for the pre-packaging section; each said movable hood comprising a lifting system providing access for washing and maintenance operations.

13. An apparatus, according to claim 12, characterized in that at end portions of said pasteurizing tunnel and between said pasteurizing and pre-packaging sections are provided four fixed hoods, three of which for collecting fumes and withdrawing vapors; each said fixed hood being coupled, through a coupling manifold, to a vapor withdrawing system.

14. An apparatus, according to claim 12, characterized in that at each said hood temperature probes are provided, said temperature probes being alternatively arranged on a right and left side of a pasteurizing zone; said temperature probes allowing to calculate a temperature average value for adjusting a sterile steam modulating valve; said sterile steam being overheated by two tube assembly exchangers including electric resistances; an overheating steam temperature being controlled by temperature probe means arranged on the overheated steam outlet tubes, through a PWM adjustment control device modulating a heating electric power; on the steam tube assembly being provided a flow rate measuring device switching off said electric resistances thereby preventing an excessive overheating of the tube assembly and preventing a steam pressure from lowering under a minimum value threshold; a temperature probe being mounted on said tube assembly.

15. An apparatus, according to claim 12, characterized in that said transfer unit comprises a lifting belt housed in a closed and sanifiable stainless steel casing, with large inspection and washing doors; said transfer belt being protected by a thermohygrometrically processed sterile atmosphere; said transfer unit operating in an overpressurized condition by air supplied from the first air processing unit.

16. An apparatus, according to claim 12, characterized in that said cooling tunnel comprises a plurality of overlapping belts thereon the food product falls; said overlapping belts being arranged in a cold air ventilated tunnel for reducing and controlling the food product temperature and relative moisture; said overlapping belts comprising at least two belts for accumulating the food product; said food products being fed with a variable feeding speed.

17. An apparatus, according to claim 12, characterized in that said second air processing unit operates to thermohygrometrically process air for controlling the moisture of the food product being cooled and to hold an overpressure for providing a sterile environment in said tunnel; said second air processing unit comprising a mixing section for mixing recirculating air and outside air, two glycol processed air cooling sections, two steam heating sections, a ventilating section and an absolute filtering section.

18. An apparatus for pasteurizing and cooling food products, characterized in that said apparatus comprises a pasteurizing tunnel, a first air processing unit associated with said pasteurizing tunnel, and a transfer unit for transferring the food products from said pasteurizing tunnel to a cooling tunnel; said cooling tunnel comprising a second air processing unit; said pasteurizing tunnel comprising two thermally independent in-line sections; said two in-line sections comprising a steam pasteurizing section and a pre-packaging section wherein said pasteurizing tunnel comprises a stainless steel belt thereon said food products to be conveyed are arranged; said belt passing through said pasteurizing section and pre-packaging section; a feeding speed adjusting system allowing to change a food product processing time in said pasteurizing tunnel and said first air processing unit processes air in the pre-packaging section through hot air, said air being thermohygrometrically controlled; said first air processing unit comprising a mixing section for mixing recirculating air and outside air, said mixing section including a plurality of gate elements, a cooling section supplied with glycol processed water, a steam post-heating section, a ventilating section and a filtering section.

* * * * *